(12) United States Patent
Vangsgaard et al.

(10) Patent No.: US 12,534,391 B2
(45) Date of Patent: Jan. 27, 2026

(54) METHOD OF CONTROLLING A WASTEWATER TREATMENT PLANT

(71) Applicant: Veolia Water Solutions & Technologies Support, Saint Maurice (FR)

(72) Inventors: Anna Katrine Vangsgaard, København N (DK); Romain Louis Gilles Lemaire, Vernou sur Brenne (FR); Bartholomeus Franciscus Smets, Brønshøj (DK); Sara Elisabet Margareta Ekström, Malmö (SE)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

(21) Appl. No.: 16/627,439

(22) PCT Filed: Jun. 29, 2018

(86) PCT No.: PCT/EP2018/067639
§ 371 (c)(1),
(2) Date: Dec. 30, 2019

(87) PCT Pub. No.: WO2019/002574
PCT Pub. Date: Jan. 3, 2019

(65) Prior Publication Data
US 2021/0094851 A1  Apr. 1, 2021

(30) Foreign Application Priority Data

Jun. 30, 2017  (EP) .................................... 17179025

(51) Int. Cl.
*C02F 3/00* (2023.01)
*C02F 3/30* (2023.01)

(52) U.S. Cl.
CPC .............. *C02F 3/006* (2013.01); *C02F 3/302* (2013.01); *C02F 2209/14* (2013.01); *C02F 2209/15* (2013.01); *C02F 2209/34* (2013.01)

(58) Field of Classification Search
CPC .. C02F 3/006; C02F 2209/22; C02F 2209/15; C02F 2209/14; C02F 3/302; C02F 2209/44; C02F 2209/34
(Continued)

(56) References Cited

U.S. PATENT DOCUMENTS 7,332,093 B2  2/2008  Rosen et al.
7,416,669 B1  8/2008  Carolan et al.
(Continued)

FOREIGN PATENT DOCUMENTS

EP  1910233 B1  3/2013
EP  3336065 A1  6/2018
(Continued)

OTHER PUBLICATIONS

Zhen Hu, et al., "Effect of aeration rate on the emission of N2O in anoxic-aerobic sequencing batch reactors (A/O SBRs)", Journal of Bioscience and Bioengineering, vol. 109, No. 5, pp. 487-491 (2010).
(Continued)

*Primary Examiner* — Claire A Norris
(74) *Attorney, Agent, or Firm* — COATS & BENNETT, PLLC (57) ABSTRACT

The present invention provides a method of controlling a wastewater treatment plant. The plant comprises at least one process tank and an aeration structure configured for aeration of the at least one process tank. The method comprises alternating steps of increasing aeration to the at least one process tank when a first event occurs, wherein the first event is one of when a first threshold value of a first tank
(Continued)

parameter is reached and when a first predetermined time period has expired, and decreasing aeration to the at least one process tank when a second event occurs, wherein the second event is one of when a second threshold value of a second tank parameter is reached and when a second predetermined time period has expired. The first and second tank parameters are selected from a group consisting of nitrate concentration, nitrite concentration, and ammonium concentration determined in the water in the at least one process tank, and the steps of increasing aeration and decreasing aeration are carried out to reduce N2O emissions from the plant.

15 Claims, 3 Drawing Sheets

(58) Field of Classification Search
USPC .......................................... 210/614, 620, 739
See application file for complete search history.

(56) References Cited

U.S. PATENT DOCUMENTS

| | | | |
|---|---|---|---|
| 7,645,385 | B2 | 1/2010 | Martin et al. |
| 2008/0314829 | A1* | 12/2008 | Zha .......................... C02F 3/308 |
| | | | 210/614 |
| 2010/0065494 | A1* | 3/2010 | Lemoine .................. C02F 3/006 |
| | | | 210/614 |
| 2015/0266759 | A1* | 9/2015 | Morgan ................... C02F 3/301 |
| | | | 210/614 |
| 2016/0115058 | A1 | 4/2016 | Labisch et al. |
| 2016/0311713 | A1 | 10/2016 | Regmi et al. |

FOREIGN PATENT DOCUMENTS

| | | |
|---|---|---|
| FR | 2954306 A1 | 6/2011 |
| FR | 2985996 A1 | 7/2013 |
| FR | 3027020 A1 | 4/2016 |
| WO | 2008068335 A1 | 6/2008 |
| WO | 2009080912 A2 | 7/2009 |
| WO | 2010106487 A1 | 9/2010 |
| WO | 2015004583 A1 | 1/2015 |
| WO | 2015062613 A1 | 5/2015 |

OTHER PUBLICATIONS

Brotto, Ariane Coelho, et al., "Characterization and Mitigation of Nitrous Oxide (N2O) Emissions From Parties- and Full-Nitrification BNR Processes Based on Post-Anoxic Aeration Control", Biotechnology and Bioengineering, vol. 112, No. 11, pp. 2241-2247 (Nov. 2015).

Jenkins, Thomas E., "Aeration Control System Design", Aeration Control System Design, pp. 103-104 (Oct. 29, 2013), John Wiley & Sons ProQuest Ebook Central, XP055590379.

* cited by examiner

METHOD OF CONTROLLING A WASTEWATER TREATMENT PLANT

RELATED APPLICATIONS

The present application is a U.S. National Stage Application of PCT Application No. PCT/US2018/067639, with an international filing date of Jun. 29, 2018. Applicant claims priority based on European Patent Application No. 17179025.6 filed Jun. 30, 2017. The subject matter of these applications is incorporated herein in their entirety.

FIELD OF THE INVENTION

The present invention relates to a method of controlling a wastewater treatment plant. The plan comprises at least one process tank and an aeration structure for aeration of the at least one process tank.

BACKGROUND OF THE INVENTION

Traditionally, wastewater is subjected to biological treatment in a wastewater treatment plant by passing it through at least one process tank. In some plants, wastewater may subsequently be passed through at least one clarification tank for separation into a water fraction and a sludge fraction.

In the process tank micro-organisms metabolize the suspended and soluble organic matter contained in the wastewater. Furthermore, nitrification, de-nitrification, and biological removal of phosphate may take place. The process tanks traditionally include a system for aeration of the tank, as the micro-organisms need oxygen for the biological treatment of the wastewater. The rate and efficiency of the treatment in the process tank is substantially proportional with the amount of micro-organisms, and it is thus important that the micro-organisms are present in the process tanks in a sufficient amount.

Nitrous oxide (N2O) is produced as a by-product during biological wastewater treatment when this includes removal of nitrogen. As wastewater treatment technologies are currently focusing on minimizing greenhouse gas emissions in general, N2O has become an important component.

Nitrous oxide (N2O) is a strong greenhouse gas with a global warming potential 300 times that of carbon dioxide (CO2). Even though relatively small amounts of N2O are emitted from wastewater treatment plants, it still contributes significantly to a facility's total greenhouse gas emissions and its carbon footprint.

Wastewater treatment plants can be optimized by applying the method described in prior art document US 2006/131232, and in that way obtain optimal traditional operational objectives, such as balancing discharge concentrations and energy consumption. US 2006/131232 discloses a method comprising a cycle with a first and a second phase, the first phase continues until sufficient nitrification is obtained and the uptake of phosphate reaches a defined level based on the current load or capacity situation, and the second phase continues until sufficient denitrification is obtained and until the storage of intercellular compounds in the phosphorus accumulation organisms (PAO) reaches a defined level, whereby nutrient removal is improved and biological phosphorous removal is improved without compromising the removal of nitrogen.

DESCRIPTION OF THE INVENTION

It is an object of embodiments of the invention to provide an improved method of controlling a wastewater treatment plant.

It is a further object of embodiment of the invention to provide a method of controlling a wastewater treatment plant which reduces N2O emissions from the plant.

According to a first aspect, the invention provides a method of controlling a wastewater treatment plant, the plant comprising at least one process tank and an aeration structure configured for aeration of the at least one process tank, the method comprising alternating steps of:
  increasing aeration to the at least one process tank when a first event occurs, wherein the first event is one of when a first threshold value of a first tank parameter is reached and when a first predetermined time period has expired, and
  decreasing aeration to the at least one process tank when a second event occurs, wherein the second event is one of when a second threshold value of a second tank parameter is reached and when a second predetermined time period has expired,
wherein the first and second tank parameters are selected from a group consisting of nitrate concentration, nitrite concentration, and ammonium concentration determined in the water in the at least one process tank, and wherein the steps of increasing aeration and decreasing aeration are carried out to reduce N2O emissions from the plant.

The wastewater plant may as an example be an activated sludge plant, a SBR (sequencing batch reactor including aerobic granular SBR), a MBR (membrane biofilm reactor), an IFAS (integrated fixed-film activated sludge), a N-removal Biofilter, a MBBR (Moving bed Biofilm reactor), and other plants including other biological processes that allows nitrification. I.e. plants comprising biological processes having an aerated reactor or aerated phase for ammonia removal (i.e. nitrification to either nitrate or nitrite) and a anoxic reactor or anoxic phase for NOx (NO2 nitrite and/or NO3 nitrate) removal (i.e. denitrification).

A first and a second predetermined time period may together form a cycle being in the range of 1-120 minutes, such as 10-60 minutes, such as 15-45 minutes. In one embodiment, the first and second time period may be substantially identical. It should however be understood, that the duration of the first and second time periods may be different. As an example, the first time period may be approximately 20-60% of the cycle, such as 25-50%, such as 35-45% of the cycle, whereas the second time period may be approximately 40-80% of the cycle, such as 50-75%, such as 55-65% of the cycle. Furthermore, the first and/or second predetermined time period may differ from one alternating step to another alternating step.

The first and/or second threshold value may as an example be in the range of 0-10 mgN/l, such as 0.1-5 mgN/l, such as 0.5-2 mgN/l, if the first and/or second tank parameter is ammonium concentration.

The first and/or second threshold value may as an example be in the range of 0-10 mgN/l, such as 0.1-5 mgN/l, such as 0.5-4 mgN/l, if the first and/or second tank parameter is nitrate concentration.

The first and/or second threshold values may differ from one alternating step to another alternating step and/or differ in dependency of time, such as time of the day and/or time of the year, as the content of the wastewater may also differ during the day and during the year.

When oxygen is supplied to the at least one process tank during an aerated phase (also denoted the N phase or the nitrification phase), the amount of nitrate and/or nitrite and N2O in the water increases, while the amount of ammonium in the water decreases. When decreasing the supply of oxygen by decreasing aeration (also denoted the DN phase or the denitrification phase), the amount of nitrate and/or nitrite and N2O in the water decreases, while the amount of ammonium in the water increases.

It should be understood, that the step of increasing aeration may comprises a step of maintaining aeration at a constant intensity. The step of decreasing aeration may likewise comprise a step of maintaining aeration at a constant intensity. Furthermore, the intensity may be changed during these steps.

As N2O is mainly produced and substantially only emitted during the aerated phase, and since N2O emissions are higher when aeration starts at a higher ammonium level, the inventors of the present invention have found that N2O emissions may be reduced by increasing the alternating frequency between the phases of increasing aeration and phases of decreasing aeration.

The method of controlling a wastewater treatment plant, thus includes alternating steps of increasing and decreasing aeration to thereby reduce N2O emission from the wastewater treatment plant.

By studying a wastewater treatment plant operated according to principles known in the art, it was found that the N2O emission factor was 0.9%. This could be significantly lowered to 0.4% (thus by more than 50%) by applying the method according to the first aspect of the invention, without deteriorating the already existing operational objectives of the wastewater treatment plant such as discharge concentrations and energy consumption for aeration.

The nitrate concentration and/or nitrite concentration and/or the ammonium concentration is/are determined in the water in the at least one process tank. In the context of the present invention, the term "determined" should be understood as measured, calculated, predicted based on forecasts and/or historical data or otherwise determined. It should further be understood, that the nitrate concentration and/or nitrite concentration in one embodiment may be measured, while the ammonium concentration may be calculated or otherwise determined, or vice versa.

It should further be understood, that in one embodiment, either nitrate, nitrite, or ammonium may be used as both the first and second threshold parameter. Thus, the first and second tank parameters may be identical. Accordingly, the first and second threshold values may be different. If the first and second tank parameters are identical, they may still be differently determined in relation to the first and second threshold value.

The at least one process tank may have different treatment zones where different processes are performed. As an example, aeration may take place only in a part of a process tank, thereby defining an aeration zone. Likewise stirring may take place in a stirring zone. It should however be understood, that a process tank may form one single zone.

Each process tank may have an outlet for supplying treated water to at least one clarification tank. In one embodiment, the outlet of a process tank may be connected to an inlet of an interrelated clarification tank. In an alternative embodiment, the outlets from two neighbouring process tanks may be connected and subsequently the treated water is supplied to one single clarification tank or supplied to a plurality of clarification tanks.

The treatment of the wastewater may be carried out at a treatment rate which may depend on different parameters, such as the actual performance of the sludge, granules, or biofilm, including the actual metabolic rate of the biomass/micro-organisms, the amount of biomass/micro-organisms, and the organic matter/load composition contained in the wastewater. As the biomass/micro-organisms are sensitive to temperature, the treatment rate may as an example be higher during summer than during winter.

The step of decreasing aeration may be continued until aeration is interrupted. Thus, in one embodiment no aeration will take place in the DN (denitrification) phase in at least some of the alternating steps.

It should be understood, that by varying the increase and decrease of aeration in dependency of a first and a second tank parameter, the length of the different time periods for the N (nitrification) phase and/or the DN phase may vary. As increasing and decreasing aeration may further depend on the expiry of a predetermined time period, the predetermined time period may also determine the length of the time period for the N and/or the DN phase.

Furthermore, increase of aeration may in one step be to a first aeration level and in another step be to a second aeration level, whereby the intensity of aeration may vary from one step to another.

The decrease of aeration may likewise to the different lower aeration levels, and in some steps aeration may be interrupted.

In one embodiment, aeration of the at least one process tank may be decreased when a third threshold value of a third tank parameter is reached. The third tank parameter may be N2O determined in the water in the at least one process tank.

The third threshold value may be in the range of 0-0.5 mgN/l, such as, 0-0.1 mgN/l, such as 0.01-0.05 mgN/l, if the third tank parameter is N2O.

The third threshold value period may differ from one alternating step to another alternating step and/or differ in dependency of time, such as time of the day and/or time of the year, as the content of the wastewater may also differ during the day and during the year.

Determination of N2O may be done by measuring, calculating, or predicting the content of N2O based on forecasts and/or historical data or otherwise determining N2O. It should further be understood, that the nitrate concentration and/or nitrite concentration and/or ammonium in one embodiment may be measured, while the N2O concentration may be calculated or otherwise determined, or vice versa.

Furthermore, is should be understood, that at least one of nitrate, nitrite, ammonium, and N2O may be measured at one time of the day/week/month whereas at the concentration at another time may e.g. be calculated or based on forecasts.

By determining a concentration of N2O in the water, decreasing of aeration may be initiated earlier than if the second threshold parameter is used alone for the control of the second alternating step; i.e. the step of decreasing aeration.

At least one of the first and second threshold values may be a lower threshold value. If nitrate is used as the first tank parameter, the step of increasing aeration may be initiated when the concentration of nitrate has reached a first threshold value being a lower value; i.e. aeration is initiated when the concentration of nitrate has reached a lower value. Likewise, if ammonium is used as the second tank parameter, the step of decreasing aeration may be initiated when the concentration of ammonium has reached a second threshold value being a lower value; i.e. aeration is decreased when the ammonium concentration has reached a lower value.

On the contrary, if nitrate is used as the second tank parameter, the step of decreasing aeration may be initiated when the concentration of nitrate has reached a second threshold value being an upper value; i.e. aeration is decreased when the nitrate concentration has reached an upper value.

Thus, at least one of the first and second threshold values may be a lower threshold value.

As mentioned above, at least one of the first, second, and third tank parameters may be measured in the water in one of the at least one process tanks. If at least one of the first, second, and third tank parameters is continuously measured, the measurements may be carried out at a predefined first time interval, such as every second hour, every fourth hours, once a day, or at another appropriate time interval. It should be understood, that the first time interval may be changed during operation of the plant, such as in dependency of weather changes, different seasons, change of wastewater quality, etc.

In one embodiment, at least one of the first, second, and third tank parameters may be determined by use of a mathematical model.

The mathematic model may describe the plant and the effects of different control strategies, and thus make predictions about behaviour. It should be understood, that the model may be used for both forecasting, control, simulation, risk analysis, optimization, and scenario generation. Different types of modelling may be applied with the goal of estimating and predicting the N2O emissions of the plant.

It should be understood, that mathematically modelling at least one of the tank parameters may include online measurements of the same tank parameter or one of the other tank parameters.

The mathematic models may further be used for Model Predictive Control (MPC) which is an advanced method for process control. The MPC is a multivariable control algorithm that uses the mathematic models of the wastewater system to predict its behaviour and plan the optimal control.

The MPC may continuously solve a mathematical optimization problem to provide a closed loop feedback and adapt to recent model changes. The objective of the MPC may be to minimize a cost function that may comprise e.g. costs of energy consumption, costs of dosing substance(s) and costs related to the effluent quality and costs related to the CO2 equivalent emissions.

In one embodiment, at least one of the first, second, and third tank parameters may be determined by use of forecast information. It should be understood, that when providing the forecast information it may include and/or may be based on historical data.

The forecast information may be based on information from a group consisting of: information from one or more rain gauges, information from weather radar(s), weather forecasts, temperature, satellite data, one or more flow measurements in the sewer system, one or more signals from one or more pumping stations arranged in the sewer system, one or more signals from online sensors arranged in the wastewater treatment plant and combinations thereof.

The aeration structure is controlled based on when a first and second event occurs, where the first/second event is one of when a first/second threshold value of a first/second tank parameter is reached and when a first/second predetermined time period has expired. The aeration may be continuously controlled e.g. based on at least one of the determined first, second, or third tank parameters. Consequently, aeration may be increased and decreased in dependency of at least one of the tank parameters at a predetermined time schedule based on a determined tank parameter which may be determined according to the same time schedule or determined according to another time schedule.

As energy costs may vary during day and night, e.g. for behaviour regulation, the method may further comprise a step of determining an energy consumption value in the plant. At least one of the first, second, and third threshold values may be changed in dependency of the energy consumption value thereby enabling lowering the costs of running the wastewater treatment plant. Thus, the method may comprise a step of changing at least one of the first, second, and third threshold values while energy consumption in the plant is monitored. The at least one of the first, second, and third threshold values may be changed until the energy consumption is decreased.

As the effluent quality of the wastewater after treatment may have to fulfil an effluent threshold value, the method may further comprise a step of monitoring a substance value for at least one of: Total-N, NH4, NO3, NO2, N2O, Total-P, $PO_4$—P, COD (Chemical Oxygen Demand), BOD (Biological Oxygen Demand), and DO (Dissolved Oxygen) in the water in the process tank. At least one of the first, second, and third threshold values may be changed in dependency of the monitored substance value until the substance value is decreased to thereby facilitate fulfilment of the requirements.

Determination of Total-N, NH4, NO3, NO2, N2O, Total-P, $PO_4$—P, COD (Chemical Oxygen Demand), BOD (Biological Oxygen Demand), and/or DO (Dissolved Oxygen) may be done by measuring, calculating, or e.g. predicting the content based on forecasts and/or historical data.

At least one of: Total-N, NH4, NO3, NO2, N2O, Total-P, $PO_4$—P, COD (Chemical Oxygen Demand), BOD (Biological Oxygen Demand), and DO (Dissolved Oxygen) may be continuously measured at a predefined second time interval.

As the wastewater quality and composition may change during the day and during the year, the method may further comprise a step of changing at least one of the first, second, and third threshold values in dependency of at least one of season and time of day.

According to a second aspect, the invention provides a wastewater treatment plant comprising at least one process tank, an aeration structure configured for aeration of the at least one process tank, at least one sensor for determining a first tank parameter and a second tank parameter, and a control unit for controlling the aeration structure, wherein the control unit is adapted to
- determine a first event being one of when a first threshold value of the first tank parameter is reached and when a first predetermined time period has expired,
- determine a second event being one of when a second threshold value of the second tank parameter is reached and when a second predetermined time period has expired,
- control the aeration structure to increase aeration to the at least one process tank in dependency of the first event, and
- control the aeration structure to decrease aeration to the at least one process tank in dependency of the second event, wherein the first and second tank parameters are selected from a group consisting of nitrate concentration, nitrite concentration, and ammonium concentration determined in the water in the at least one process tank, and wherein the control unit control the aeration to reduce N2O emissions from the plant.

The control unit may comprise computer means and memory means to determine the first and second events. The first/second event is one of when a first/second threshold value of the first/second tank parameter is reached and when a first/second predetermined time period has expired.

The first and second predetermined time period may be stored in the memory means. The first and second threshold values may likewise be stored in the memory means. When determining the first and second tank parameters e.g. by measuring the parameters by one or more sensors these first and second tank parameters may also be stored in the memory means. Alternatively, the control unit may determine the first and second event by comparing the determined first and second tank parameters with stored threshold values.

In one embodiment, it may be possible to change the first and/or second predetermined time period, e.g. by loading new values to the memory or by selecting new values from a table of values of the first and/or second predetermined time period stored in the memory means.

The plant comprises at least one sensor for determining a first tank parameter and a second tank parameter. In one embodiment, the first and second tank parameter may be determined by a single sensor capable of determining both the first and second tank parameter. Alternatively, the first and second tank parameter may be determined by different sensors. It should further be understood that e.g. the first tank parameter may be determined by the use of a plurality of sensors, e.g. being arranged at different positions in the at least one process tank. Subsequently, the first tank parameter may be determined as an average of the measured values or as a weighted average of the measured values, e.g. weighted in dependency of the position of the sensors.

It should be understood that "determined" in addition to measured, also covers calculated, predicted or otherwise determined parameters.

Controlling the aeration structure to increase aeration may be performed by transfer of a signal to the aeration structure which in response to the received signal increases aeration. The signal may further contain information of the extent to which the aeration should be increased.

Controlling the aeration structure to decrease aeration may likewise be performed by transfer of a signal to the aeration structure which in response to the received signal decreases aeration.

It should be understood, that a skilled person would readily recognise that any feature described in combination with the first aspect of the invention could also be combined with the second aspect of the invention, and vice versa.

The method of controlling a wastewater treatment plant according to the first aspect of the invention is very suitable in relation to the wastewater treatment plant according to the second aspect of the invention. The remarks set forth above in relation to the method are therefore equally applicable in relation to the plant.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
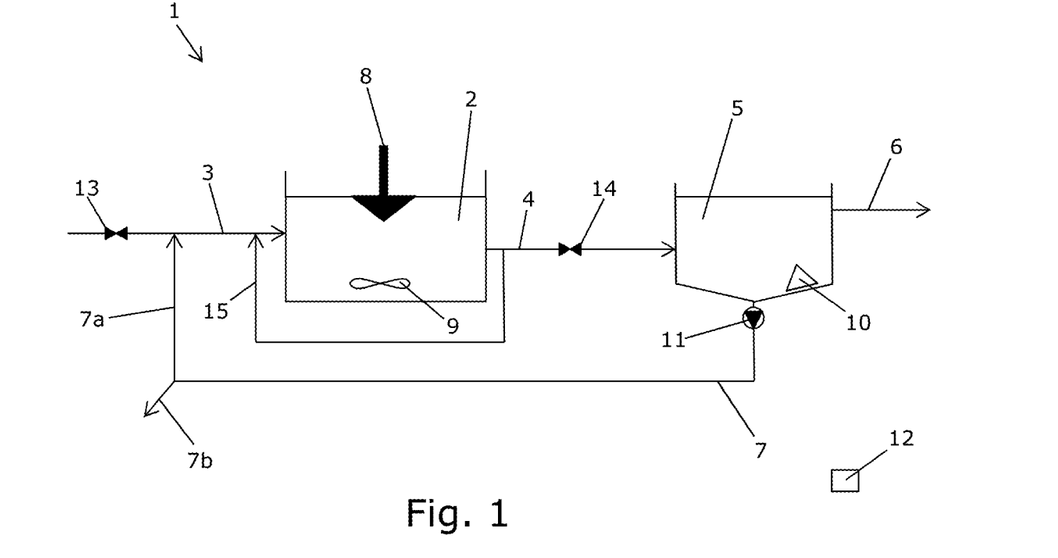
FIG. 1 schematically illustrates an embodiment of a wastewater treatment plant in the form of an activated sludge plant, FIG. 2 graphically illustrates of a traditional control strategy for an activated sludge plant, FIG. 3 graphically illustrates measured values from a plant operated by a traditional control strategy, FIG. 4 graphically illustrates of a control strategy for an activated sludge plant according to the invention, and FIG. 5 graphically illustrates measured values from a plant operated according to the invention.

FIG. 1 schematically illustrates a wastewater treatment plant in the form of an activated sludge plant 1. It should be understood, that an activated sludge plant is only one example of a wastewater treatment plant in which the claimed method can be used for control.

The plant 1 comprises at least one process tank 2 (of which only one is illustrated) comprising activated sludge. Each process tank 2 has an inlet 3 for receiving wastewater and an outlet 4 for supplying treated water to a clarification tank 5 for separation into a water fraction and a sludge fraction. The clarification tank 5 of the illustrated embodiment comprises a first outlet 6 for water and a second outlet 7 for water comprising sludge.

One fraction of the water comprising sludge may be returned to the inlet 3 via the return inlet 7a whereas another fraction comprising excess sludge may be removed via the excess outlet 7b.

The plant 1 comprises an aeration structure 8 configured for aeration of the process tank 2 to ensure a sufficient amount of oxygen for the micro-organism for the biological treatment of the wastewater.

Furthermore, the illustrated plant 1 comprises a stirring structure 9 configured for stirring of the process tank 2 to improve the conditions for micro-organisms.

The illustrated plant 1 further comprises a sludge scraper structure 10 configured for scraping of the clarification tank 5, and a sludge pump 11 configured for pumping sludge from the clarification tank 5.

Treatment of wastewater in the plant 1 comprises at least the steps of increasing aeration to the at least one process tank 2 when a first event occurs, where the first event is one of when a first threshold value of a first tank parameter is reached and when a first predetermined time period has expired, and decreasing aeration to the at least one process tank 2 when a second event occurs, where the second event is one of when a second threshold value of a second tank parameter is reached and when a second predetermined time period has expired, where the first and second tank parameters are selected from a group consisting of nitrate concentration, nitrite concentration, and ammonium concentration determined in the water in the at least one process tank 2, and wherein the steps of increasing aeration and decreasing aeration are carried out to reduce N2O emissions from the plant.

Increasing and decreasing aeration in the process tank 2 may be controlled by a control unit 12 which is configured for communication with the aeration structure 8.

Furthermore, the control unit 12 may be in communication with a number of valves 13, 14 configured to interrupt supply to the process tank 2 and the clarification tank 5, respectively, by closing said valve. Supply may be resumed by opening of the valve 13, 14 and may be controlled by the control unit 12.

In the illustrated embodiment, the activated sludge plant 1 further comprises a pumping structure 15 configured for recirculation of at least a part of the treated water from the process tank 2.

Figure 2:
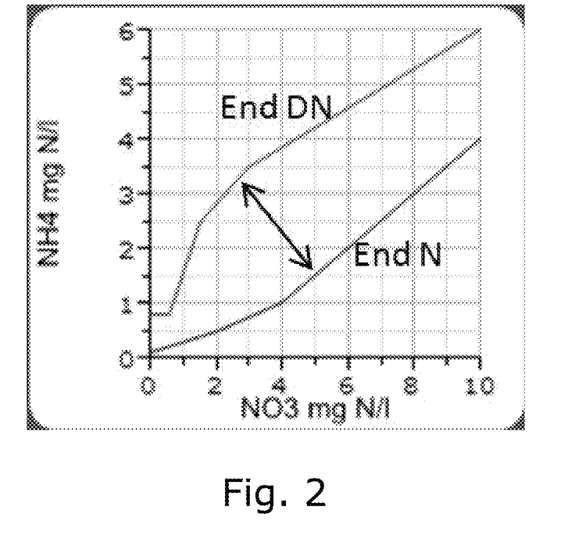

FIG. 2 graphically illustrates of a traditional control strategy for an activated sludge plant. The plant is controlled based on two criteria "end N (nitrification) phase" and "end DN (denitrification) phase", corresponding to interrupting and starting aeration, respectively. During nitrification, ammonium concentrations change from high to low, while nitrate concentrations change from low to high. The nitrification phase ends at a point where the coordinates of ammonium and nitrate cross the curve of the criteria function for the nitrification phase.

The opposite situation applies to the denitrification phase. The ammonium and nitrate concentrations are maintained in the area between the two criteria functions and move in the direction of the arrow either towards "end N" or towards "end DN".

Figure 3:
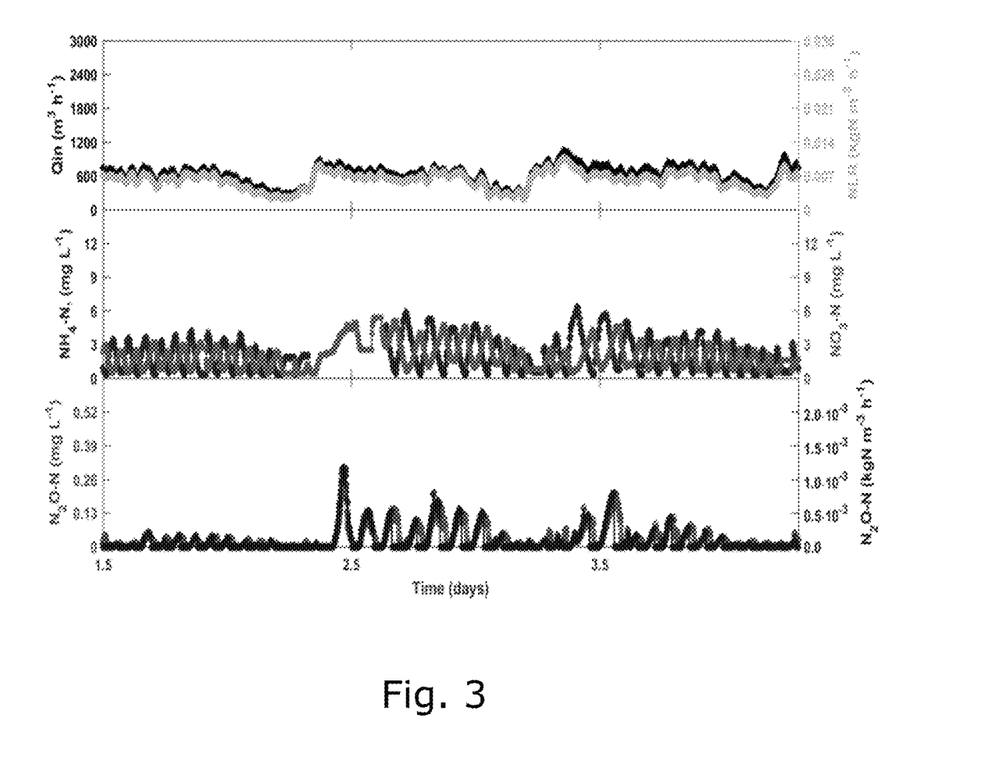

FIG. 3 graphically illustrates measured values from a wastewater treatment plant operated by a traditional control strategy as illustrated in FIG. 2. FIG. 3 illustrates effluent nitrogen concentrations (middle plot), and corresponding N2O production and emissions (bottom plot).

By application of a traditional control strategy, alternations between the nitrification and the denitrification phase occurred 24 times per day. Thus, a cycle comprising both a nitrification phase and a denitrification phase lasted in average 120 minutes.

Figure 4:
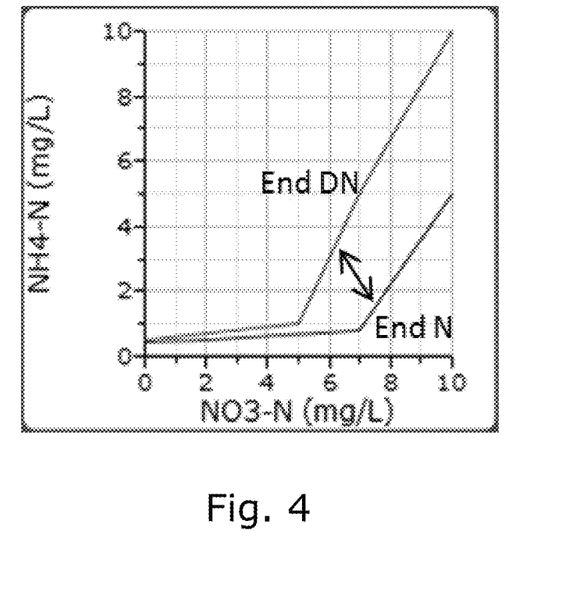

FIG. 4 graphically illustrates of a control strategy for an activated sludge plant according to the invention, where the limitation of N2O production and emission is obtained by setting upper values to the ammonium concentrations (of the criteria function DN phase) to a threshold value and by operating the process at a narrow interval between the criteria functions. This control results in fast phase shifts since i) denitrification phase comes to an end at low ammonium concentrations; ii) low ammonium concentrations at the start of the aerated phase shorten the duration of the aerated phase.

Since N2O is mainly produced and substantially only emitted during the aerated nitrification phase and since emissions increase when the aeration phase starts at high ammonium concentrations, these actions reduce the rate at which N2O is produced, the period in which N2O is produced and emitted, and thus overall decrease the magnitude of N2O emissions.

Figure 5:
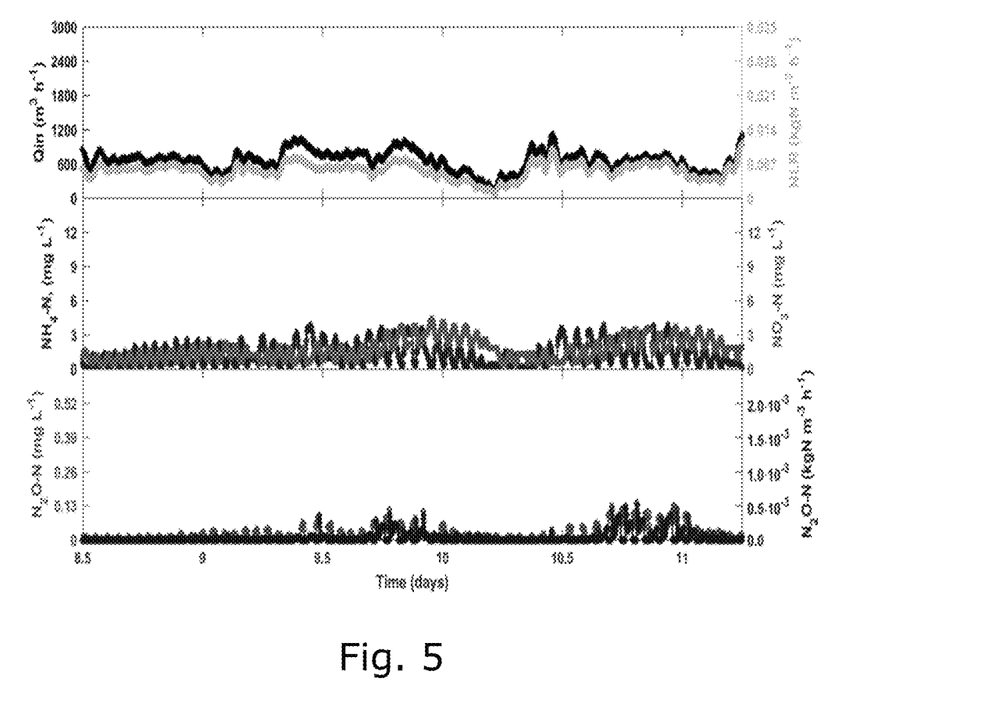

FIG. 5 graphically illustrates measured values from a plant operated according to the invention using the control illustrated in FIG. 4. FIG. 5 illustrates effluent nitrogen concentrations (middle plot), and corresponding N2O production and emissions (bottom plot).

By application of the control according to the first aspect of the invention, alternation between nitrification and denitrification phase occurs 35 times per day in the illustrated embodiment. A cycle comprising both a nitrification phase and a denitrification phase lasted in average 80 minutes, which is 50% shorter than operation with traditional control.

The invention claimed is:

1. A wastewater treatment plant comprising:
at least one process tank for containing wastewater;
an aeration structure configured to aerate the wastewater in the process tank;
at least one sensor for detecting a first tank parameter, a second tank parameter, and a third tank parameter, wherein the first and second tank parameters are selected from a group consisting of nitrate concentration, nitrite concentration, and ammonium concentration determined in the water in the process tank, the third tank parameter being $N_2O$ determined in the water in the process tank;
a control unit comprising a computer having a memory and configured to determine a first and a second event, and wherein a first and a second predetermined time period and a first, second, and third threshold value are stored in the memory;
wherein the control unit is configured to reduce the $N_2O$ emissions from the wastewater treatment plant while treating the wastewater in the at least one process tank by controlling an alternating frequency between phases of increased aeration and phases of decreased aeration by:
   a. increasing aeration to the wastewater in the process tank when the first event occurs, wherein the first event occurs: (1) when the first threshold value of the first tank parameter is reached, or (2) when the first predetermined time period has expired, whichever occurs first;
   b. decreasing aeration to the wastewater in the process tank when the second event occurs, wherein the second event occurs: (1) when the second threshold value of the second tank parameter is reached, or (2) when the second predetermined time period has expired, or (3) when the third threshold value of the third tank parameter is reached, whichever occurs first; and
   c. wherein the third threshold value of the third tank parameter is an initial third threshold value determined during a nitrification phase.

2. A method of controlling a wastewater treatment plant and reducing $N_2O$ emissions from the plant where the plant comprises at least one process tank for containing wastewater, an aeration structure configured to aerate the wastewater in the process tank, at least one sensor for detecting a first tank parameter, a second tank parameter, and a third tank parameter wherein the first and second tank parameters are selected from a group consisting of nitrate concentration, nitrite concentration, and ammonium concentration determined in the wastewater in the process tank, and where the third tank parameter is $N_2O$ that is determined in the water of the process tank, a control unit for controlling the aeration structure wherein the control unit comprises a computer having a memory and configured to determine a first event and a second event, and wherein a first and second predetermined time period and first, second, and third threshold values for the first, second, and third tank parameters are stored in the memory, the method comprising:
reducing the $N_2O$ emissions from the wastewater treatment plant while treating the wastewater in the at least one process tank by controlling the alternating frequency between phases of increased aeration and phases of decreased aeration by:
   increasing aeration to the wastewater in the process tank when the first event occurs, wherein the first event occurs: (1) when the first threshold value of the first tank parameter is reached, or (2) when the first predetermined time period has expired, whichever occurs first; and
   decreasing the aeration to the wastewater in the process tank when the second event occurs, wherein the second event occurs: (1) when the second threshold value of the second tank parameter is reached, or (2) when the second predetermined time period has expired, or (3) when the third threshold value of the third tank parameter is reached, whichever occurs first; and wherein the third threshold value of the third tank parameter is an initial third threshold value determined during a nitrification phase.

3. The method according to claim 2, wherein the first and second tank parameters are identical.

4. The method according to claim 2, wherein at least one of the first, second, and third tank parameters is measured in the water in one of the at least one process tanks.

5. The method according to claim 4, wherein at least one of the first, second, and third tank parameters is continuously measured at a predefined first time interval.

6. The method according to claim 2, wherein at least one of the first, second, and third tank parameters is determined by use of mathematical model.

7. The method according to claim 2, wherein at least one of the first, second, and third tank parameters is determined by use of forecast information.

8. The method according to claim 7, wherein the forecast information is based on information from a group consisting of: information from one or more rain gauges, weather radar, weather forecasts, temperature, satellite data, one or more flow measurements in a sewer system, one or more signals from one or more pumping stations arranged in the sewer system, and combinations thereof.

9. The method according to claim 2, wherein the aeration structure is continuously controlled based on at least one of the determined first, second, or third tank parameters.

10. The method according to claim 2, further comprising a step of changing at least one of the first, second, and third threshold values while energy consumption in the plant is monitored, and wherein at least one of the first, second, and third threshold values is changed until the energy consumption is decreased.

11. The method according to claim 2, further comprising a step of monitoring a substance value for at least one of: Total-N, NH4, NO3, NO2, N2O, Total-P, $PO_4$—P, COD (Chemical Oxygen Demand), BOD (Biological Oxygen Demand), and DO (Dissolved Oxygen) in the water in the process tank, and wherein at least one of the first, second, and third threshold values is changed in dependency of the monitored substance value until the substance value is decreased.

12. The method according to claim 11, wherein at least one of: Total-N, NH4, NO3, NO2, N2O, Total-P, PO4—P, COD (Chemical Oxygen Demand), BOD (Biological Oxygen Demand), and DO (Dissolved Oxygen) is continuously measured at a predefined second time interval.

13. The method of claim 2 further comprising:

wherein increasing the aeration to the wastewater causes the wastewater to be subjected to a nitrification phase;

wherein decreasing the aeration to the wastewater causes the wastewater to be subjected to a denitrification phase;

wherein the first tank parameter is the ammonia concentration of the wastewater;

wherein the second tank parameter is the ammonia concentration in the wastewater;

wherein the second threshold value for the ammonia concentration in the wastewater is a relatively high threshold ammonia concentration value compared to the first threshold value for the ammonia concentration;

wherein the first threshold value for the ammonia concentration in the wastewater is a relatively low threshold ammonium concentration value compared to the second threshold value for the ammonia concentration; and wherein the relatively high and relatively low threshold ammonium concentration values control the alternating frequency between phases of increased aeration and phases of decreased aeration and has the effect of shortening the nitrification phase and decreasing the magnitude of $N_2O$ emissions from the wastewater treatment plant.

14. The method of claim 13 wherein the nitrification phase and the denitrification phase constitute a cycle wherein the duration of one cycle on average is approximately 120 minutes.

15. The method of claim 2 further including:

wherein increasing aeration to the wastewater results in periods of aerating the wastewater;

wherein decreasing aeration to the wastewater results in periods where the wastewater is not aerated; and wherein the first threshold value, the second threshold value, the third threshold value, the first predetermined time period, and the second predetermined time period are selected such that on average the periods of aerating the wastewater are shorter than the periods when the wastewater is not aerated.

* * * * *